(12) United States Patent
Zhu et al.

(10) Patent No.: US 11,797,122 B2
(45) Date of Patent: Oct. 24, 2023

(54) TOUCH METHOD, TOUCH CIRCUIT AND TOUCH DEVICE

(71) Applicants: Wuhan BOE Optoelectronics Technology Co., Ltd., Hubei (CN); BOE TECHNOLOGY GROUP CO., LTD., Beijing (CN)

(72) Inventors: Ning Zhu, Beijing (CN); Jian Zhao, Beijing (CN); Peng Jiang, Beijing (CN); Jiantao Liu, Beijing (CN)

(73) Assignees: Wuhan BOE Optoelectronics Technology Co., Ltd., Hubei (CN); BOE TECHNOLOGY GROUP CO., LTD., Beijing (CN)

( * ) Notice: Subject to any disclaimer, the term of this patent is extended or adjusted under 35 U.S.C. 154(b) by 134 days.

(21) Appl. No.: 17/422,427

(22) PCT Filed: Sep. 25, 2020

(86) PCT No.: PCT/CN2020/117857
§ 371 (c)(1),
(2) Date: Jul. 12, 2021

(87) PCT Pub. No.: WO2022/061747
PCT Pub. Date: Mar. 31, 2022

(65) Prior Publication Data
US 2022/0342527 A1    Oct. 27, 2022

(51) Int. Cl.
*G06F 3/041*    (2006.01)

(52) U.S. Cl.
CPC ...... *G06F 3/04164* (2019.05); *G06F 3/04166* (2019.05); *G06F 3/04182* (2019.05)

(58) Field of Classification Search
CPC ............. G06F 3/04164; G06F 3/04166; G06F 3/04182
See application file for complete search history.

(56) References Cited

U.S. PATENT DOCUMENTS

| 2014/0125626 A1* | 5/2014 | Yang | G06F 3/0443 345/174 |
| 2014/0176489 A1* | 6/2014 | Park | G06F 3/04166 345/174 |
| 2014/0285465 A1* | 9/2014 | Hayashi | G06F 3/04166 345/174 |

\* cited by examiner

*Primary Examiner* — Towfiq Elahi
(74) *Attorney, Agent, or Firm* — McCoy Russell LLP

(57) ABSTRACT

A touch method, a touch circuit and a touch device are provided. The touch method includes: in a$^{th}$ touch time period, providing a touch driving signal to a$^{th}$ touch driving electrode; wherein a is a positive integer, a is less than or equal to A, and A is a positive integer; in a$^{th}$ background data detection time period, providing a touch accompanying signal to N touch driving electrodes adjacent to the a$^{th}$ touch driving electrode; wherein N is a positive integer; and performing touch detection according to a$^{th}$ touch sensing signal on touch sensing electrodes in the a$^{th}$ touch time period and a$^{th}$ background data voltage signal on the touch sensing electrodes in the a$^{th}$ background data detection time period; wherein an amplitude of the touch accompanying signal is less than an amplitude of the touch driving signal.

17 Claims, 4 Drawing Sheets

TOUCH METHOD, TOUCH CIRCUIT AND TOUCH DEVICE

TECHNICAL FIELD

The present disclosure relates to the field of touch control technology, in particular to a touch method, a touch circuit and a touch device.

CROSS REFERENCE TO RELATED APPLICATION

The present application is a U.S. National Phase of International Application No. PCT/CN2020/117857 entitled "TOUCH METHOD, TOUCH CIRCUIT AND TOUCH DEVICE," and filed on Sep. 25, 2020. The entire contents of the above-listed application is hereby incorporated by reference for all purposes.

BACKGROUND AND SUMMARY

In the related art, a mutual capacitance touch panel suffers from many disadvantages, such as, the touch panel is easily interfered by signal fluctuation, touch failure may result when introduced to a different environment, and the signal-to-noise ratio is not high. Meanwhile, in the mutual capacitance touch panel, an amplitude of a touch driving signal loaded to a touch driving electrode may be up to dozens of volts, and due to the accumulation of electrostatic charges, an electro-static discharge (ESD) is prone to occur between a scan-line touch driving electrode and a non-scan-line touch driving electrode to damage a touch integrated circuit (IC), so that the touch panel is seriously damaged and cannot work normally.

In one aspect, an embodiment of the present disclosure provides a touch method applied to a touch panel, wherein the touch panel includes A touch driving electrodes and a plurality of touch sensing electrodes arranged on a substrate, and A is a positive integer; a touch cycle includes a plurality of touch time periods and a plurality of background data detection time periods; an $a^{th}$ background data detection time period is provided after an $a^{th}$ touch time period and before an $(a+1)^{th}$ touch time period; and the touch method includes:

in the $a^{th}$ touch time period, providing a touch driving signal to an $a^{th}$ touch driving electrode; wherein a is a positive integer, and a is less than or equal to A;

in the $a^{th}$ background data detection time period, providing a touch accompanying signal to N touch driving electrodes adjacent to the $a^{th}$ touch driving electrode; wherein N is a positive integer; and performing touch detection according to an $a^{th}$ touch sensing signal on the touch sensing electrodes in the $a^{th}$ touch time period and an $a^{th}$ background data voltage signal on the touch sensing electrodes in the $a^{th}$ background data detection time period;

wherein an amplitude of the touch accompanying signal is less than an amplitude of the touch driving signal.

Optionally, the touch method according to at least one embodiment of the present disclosure further includes: in the $a^{th}$ touch time period and the $a^{th}$ background data detection time period, providing a ground voltage to touch driving electrodes included in the touch panel, except for the $a^{th}$ touch driving electrode and the N touch driving electrodes.

Optionally, the touch accompanying signal and the touch driving signal are of the same type.

Optionally, the touch accompanying signal and the touch driving signal are both square wave signals, or the touch accompanying signal and the touch driving signal are both sine wave signals.

Optionally, a cycle of the touch accompanying signal is equal to a cycle of the touch driving signal; in a case that the touch accompanying signal and the touch driving signal are both square wave signals, a pulse width of the touch accompanying signal is equal to a pulse width of the touch driving signal.

Optionally, a ratio between the amplitude of the touch accompanying signal and the amplitude of the touch driving signal is greater than or equal to 0.05, and less than or equal to 0.3.

Optionally, N is less than or equal to 10.

Optionally, the $a^{th}$ touch driving electrode is a first touch driving electrode included in the touch panel, and the N touch driving electrodes include a second touch driving electrode included in the touch panel to an $(N+1)^{th}$ touch driving electrode included in the touch panel; or, the $a^{th}$ touch driving electrode is a last touch driving electrode included in the touch panel, and the N touch driving electrodes include a second-to-last touch driving electrode included in the touch panel to an $(N+1)^{th}$-to-last touch driving electrode included in the touch panel; or, the $a^{th}$ touch driving electrode is a touch driving electrode included in the touch panel that is different from the first touch driving electrode and the last touch driving electrode, a part of the N touch driving electrodes are arranged before the $a^{th}$ touch driving electrode, and other part of the N touch driving electrodes are arranged after the $a^{th}$ touch driving electrode.

Optionally, in a case that the $a^{th}$ touch driving electrode is a touch driving electrode included in the touch panel that is different from the first touch driving electrode and the last touch driving electrode, N is an even number, N/2 touch driving electrodes are arranged before the $a^{th}$ touch driving electrode, and N/2 touch driving electrodes are arranged after the $a^{th}$ touch driving electrode.

Optionally, the performing the touch detection according to the $a^{th}$ touch sensing signal on the touch sensing electrodes in the $a^{th}$ touch time period and the $a^{th}$ background data voltage signal on the touch sensing electrodes in the $a^{th}$ background data detection time period includes:

comparing the $a^{th}$ touch sensing signal with the $a^{th}$ background data voltage signal to obtain an $a^{th}$ touch difference signal between the $a^{th}$ touch sensing signal and the $a^{th}$ background data voltage signal;

amplifying the $a^{th}$ touch difference signal to obtain an amplified $a^{th}$ touch difference signal; and performing the touch detection according to the amplified $a^{th}$ touch difference signal.

Optionally, a touch blank time period is provided between two adjacent touch cycles, and the touch method further includes:

detecting an initial touch state of the touch panel in the touch blank time period, and performing the touch detection according to the initial touch state of the touch panel.

Optionally, the detecting the initial touch state of the touch panel in the touch blank time period includes:

in the touch blank time period, providing a touch driving signal to the touch driving electrodes and receiving a touch sensing signal fed back by the touch driving electrodes so as to determine the initial touch state of the touch panel; or, in the touch blank time period, providing a touch driving signal to the touch sensing electrodes and receiving the touch sensing signal fed back by the touch sensing electrodes so as to determine the initial touch state of the touch panel.

In a second aspect, the present disclosure further provides a touch circuit applied to a touch panel, wherein the touch panel includes A touch driving electrodes and A touch sensing electrodes arranged on a substrate, and A is a positive integer; a touch cycle includes a plurality of touch time periods and a plurality of background data detection time periods; an $a^{th}$ background data detection time period is provided after an $a^{th}$ touch time period and before an $(a+1)^{th}$ touch time period; and the touch circuit includes:

a touch driving circuit, configured to provide a touch driving signal to an $a^{th}$ touch driving electrode in the $a^{th}$ touch time period, and provide a touch accompanying signal to N touch driving electrodes adjacent to the $a^{th}$ touch driving electrode in the $a^{th}$ background data detection time period; and, a touch detection circuit, configured to perform touch detection according to an $a^{th}$ touch sensing signal on the touch sensing electrodes in the $a^{th}$ touch time period and an $a^{th}$ background data voltage signal on the touch sensing electrodes in the $a^{th}$ background data detection time period;

wherein a is a positive integer, and a is less than or equal to A; N is a positive integer; and an amplitude of the touch accompanying signal is less than an amplitude of the touch driving signal.

Optionally, the touch driving circuit is further configured to provide a ground voltage to touch driving electrodes included in the touch panel, except for the $a^{th}$ touch driving electrode and the N touch driving electrodes, in the $a^{th}$ touch time period and the $a^{th}$ background data detection time period.

Optionally, the touch accompanying signal and the touch driving signal are of the same type;

the touch accompanying signal and the touch driving signal are both square wave signals, or the touch accompanying signal and the touch driving signal are both sine wave signals;

a ratio between the amplitude of the touch accompanying signal and the amplitude of the touch driving signal is greater than or equal to 0.05, and less than or equal to 0.3.

Optionally, the $a^{th}$ touch driving electrode is a first touch driving electrode included in the touch panel, and the N touch driving electrodes include a second touch driving electrode included in the touch panel to an $(N+1)^{th}$ touch driving electrode included in the touch panel; or, the $a^{th}$ touch driving electrode is a last touch driving electrode included in the touch panel, and the N touch driving electrodes include a second-to-last touch driving electrode included in the touch panel to an $(N+1)^{th}$-to-last touch driving electrode included in the touch panel; or, the $a^{th}$ touch driving electrode is a touch driving electrode included in the touch panel that is different from the first touch driving electrode and the last touch driving electrode, a part of the N touch driving electrodes are arranged before the $a^{th}$ touch driving electrode, and other part of the N touch driving electrodes are arranged after the $a^{th}$ touch driving electrode.

Optionally, the touch circuit according to at least one embodiment of the present disclosure further includes a comparison circuit and a signal amplification circuit;

the comparison circuit is configured to compare the $a^{th}$ touch sensing signal with the $a^{th}$ background data voltage signal to obtain an $a^{th}$ touch difference signal between the $a^{th}$ touch sensing signal and the $a^{th}$ background data voltage signal;

the signal amplification circuit is configured to amplify the $a^{th}$ touch difference signal to obtain an amplified $a^{th}$ touch difference signal; and the touch detection circuit is specifically configured to perform the touch detection according to the amplified $a^{th}$ touch difference signal.

Optionally, the touch detection circuit is further configured to detect an initial touch state of the touch panel in a touch blank time period, and perform the touch detection according to the initial touch state of the touch panel; and the touch blank time period is provided between two adjacent touch cycles.

Optionally, the touch driving circuit is configured to provide a touch driving signal to the touch driving electrode or the touch sensing electrodes in the touch blank time period; and the touch detection circuit is specifically configured to receive a touch sensing signal fed back by the touch driving electrodes or the touch sensing electrodes in the touch blank time period so as to detect the initial touch state of the touch panel.

In a third aspect, the present disclosure further provides a touch device including the above-mentioned touch circuit.

DETAILED DESCRIPTION

The technical solutions in embodiments of the present disclosure will now be described more fully hereinafter with reference to the accompanying drawings, in which some, but not all embodiments of the present disclosure are described. Based on the embodiments in the present disclosure, all other embodiments obtained by a person of ordinary skill in the art without inventive effort are within the scope of protection of the present disclosure.

Transistors used in all embodiments of the present disclosure may be triodes, thin film transistors or field effect transistors or other devices having similar characteristics. In embodiments of the present disclosure, in order to distinguish between two electrodes of a transistor other than a control electrode, one of the two electrodes is referred to as a first electrode and the other of the two electrodes is referred to as a second electrode.

During actual operation, when the transistor is a triode, the control electrode may be a base electrode, the first electrode may be a collector electrode, and the second electrode may be an emitter electrode; or, the control electrode may be a base electrode, the first electrode may be an emitter electrode, and the second electrode may be a collector electrode.

During actual operation, when the transistor is a thin film transistor or a field effect transistor, the control electrode may be a gate electrode, the first electrode may be a drain electrode, and the second electrode may be a source electrode; or, the control electrode may be a gate electrode, the first electrode may be a source electrode, and the second electrode may be a drain electrode.

Figure 1:
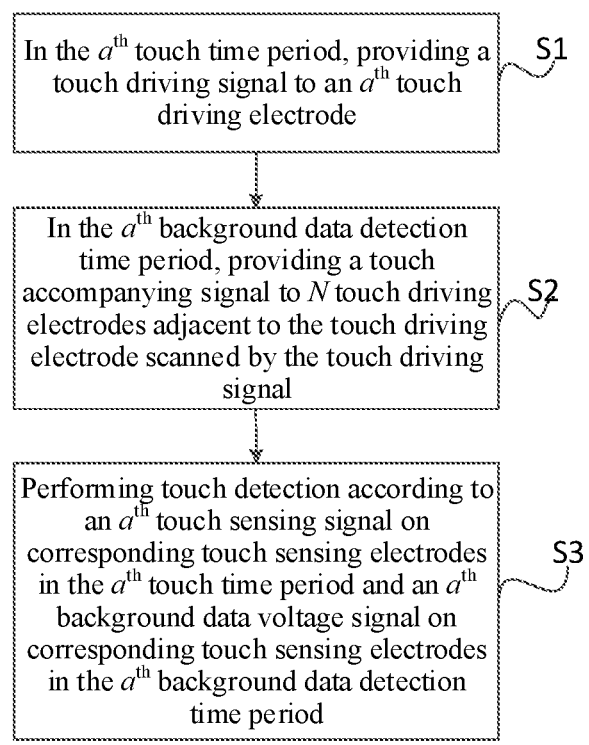
FIG. 1 is a flowchart of a touch method according to at least one embodiment of the present disclosure.

A touch method according to at least one embodiment of the present disclosure is applied to a touch panel, the touch panel includes A touch driving electrodes and A touch sensing electrodes which are arranged on a substrate, and A is a positive integer; a touch cycle includes a plurality of touch time periods and a plurality of background data detection time periods; an $a^{th}$ background data detection time period is provided after an $a^{th}$ touch time period and before an $(a+1)^{th}$ touch time period; as shown in FIG. 1, the touch method includes:

S1: in the $a^{th}$ touch time period, providing a touch driving signal to an $a^{th}$ touch driving electrode; wherein a is a positive integer, and a is less than or equal to A;

S2: in the $a^{th}$ background data detection time period, providing a touch accompanying signal to N touch driving electrodes adjacent to the $a^{th}$ touch driving electrode; wherein N is a positive integer;

S3: performing touch detection according to an $a^{th}$ touch sensing signal on the touch sensing electrodes in the $a^{th}$ touch time period and an $a^{th}$ background data voltage signal on the touch sensing electrodes in the $a^{th}$ background data detection time period;

wherein an amplitude of the touch accompanying signal is less than an amplitude of the touch driving signal.

In at least one embodiment of the present disclosure, the touch driving signal and the touch accompanying signal may both be voltage signals.

In a specific implementation, the touch panel may be a mutual capacitance touch panel, and the touch panel may include A touch driving electrodes and a plurality of touch sensing electrodes which are arranged in an array on a substrate, wherein the touch driving electrodes may extend along a row direction, and the touch sensing electrodes may extend along a column direction, but the present disclosure are not limited thereto.

In at least one embodiment of the present disclosure, the touch driving signal and the touch accompanying signal should be substantially alike except for amplitude; for example, a cycle of the touch driving signal should be approximately the same as a cycle of the touch accompanying signal; when the touch driving signal and the touch accompanying signal are both square wave signals, a pulse width of the touch driving signal may be approximately the same as a pulse width of the touch accompanying signal.

In at least one embodiment of the present disclosure, the touch driving signal is provided to the A touch driving electrodes sequentially, the touch accompanying signal is provided to the N touch driving electrodes adjacent to the $a^{th}$ touch driving electrode in the background data detection time period provided after the touch time period, and the touch detection is performed according to the $a^{th}$ touch sensing signal on the touch sensing electrodes in the $a^{th}$ touch time period and the $a^{th}$ background data voltage signal on the touch sensing electrodes in the $a^{th}$ background data detection time period.

In the related art, a manner for determining an environmental noise of a touch screen in a conventional situation is that an original data signal is intercepted as a background data signal when a startup or a cut-off screen is being displayed, and a touch event is detected according to a difference value between a detected touch sensing signal in a touch time period and the background data signal, wherein a position with a distinct difference value is regarded as a touch point position.

According to the touch method of at least one embodiment of the present disclosure, the touch accompanying signal is provided to the N touch driving electrodes adjacent to the $a^{th}$ touch driving electrode in the $a^{th}$ background data detection time period, and the $a^{th}$ background data voltage signal on the touch sensing electrodes in the $a^{th}$ background data detection time period is selected as the background data signal. Due to the fact that the a touch accompanying signal is loaded on the N touch driving electrodes, and the amplitude of the touch accompanying signal is less than the amplitude of the touch driving signal, the stability of the $a^{th}$ background data voltage signal provided by the touch accompanying signal is better than the stability of the background data signal provided in the related art. With the $a^{th}$ background data voltage signal is selected as the background data signal, a threshold value can be increased appropriately, noise points generated by tiny signals can be effectively shielded, effective signals are more obvious, and a signal-to-noise ratio is improved.

In at least one embodiment of the present disclosure, signals on a scan-line touch driving electrode and adjacent lines of touch driving electrodes have a stepwise drop in voltage, so that a risk of electro-static discharge (ESD) can be effectively reduced, and point discharge caused under a high voltage condition can be effectively prevented with the stepwise voltage drop.

In addition, an environment where the touch panel is located is changed frequently, and a humidity and a degree of static charge accumulation of different environments are different. A loading manner of the touch driving signal is reasonably adjusted, so that the touch panel has a self-adaptive effect, and a touch performance is improved.

With the touch method of at least one embodiment of the present disclosure, both the scan-line touch driving electrode and adjacent lines of touch driving electrodes are loaded with touch driving signals of the same type. At this time, the touch accompanying signal provided to the adjacent lines of touch driving electrodes can give rise to a noise voltage value higher than a voltage value of a noise excited in the related art and can play a role in amplifying interference data in background data, so that a touch detection result is more accurate.

With the touch method of at least one embodiment of the present disclosure, both the scan-line touch driving electrode and adjacent lines of touch driving electrodes are loaded with signals of the same type. At this time, the amplitudes of the touch accompanying signal provided to the adjacent lines of touch driving electrodes are small, a minor capacitance change can be coupled, and a boundary position of a finger or a touch object can be more easily determined by driving the adjacent lines of touch driving electrodes, and the touch position accuracy is improved.

Moreover, with the touch method of at least one embodiment of the present disclosure, dirt and water stains can be determined. Generally, dirt and water stains gather in a relatively large area, and areas of the dirt and water stain cannot be effectively identified with merely a certain line of touch driving electrode. With the touch method of at least one embodiment of the present disclosure, extent of water stains and dirt can be effectively covered by the scan-line touch driving electrode and the adjacent lines of touch driving electrodes, so that effective screening and point reporting are realized.

For example, generally, a size of a single node in a large-size touch panel is 6 mm, then a coverage range of five nodes is 30 mm, which can cover a size of a normal water drop. When a large object touching the touch panel is scanned at the positions of the scan-line touch driving electrode and adjacent lines of touch driving electrodes simultaneously, the attribute of the large object can be determined through a change in capacitance value. For example, a suspended water drop and a touch by an actual human body or active stylus would give rise to different change direction (positive/negative) of the capacitance value. Part of electric field lines may be absorbed when the human body touches, thus the electric field lines between the touch driving electrode and the touch sensing electrodes are reduced. The water drop is usually in a suspended state and may be used as a medium layer for electric field transmission between the touch driving electrode and the touch sensing electrodes, and a dielectric constant of the water drop is larger than that of air, so that the electric field strength between the touch driving electrode and the touch sensing electrodes is increased.

In at least one embodiment of the present disclosure, signals on the scan-line touch driving electrode, the adjacent lines of touch driving electrodes and remote touch driving electrodes have a stepwise voltage drop, so that a risk of electro-static discharge (ESD) can be effectively reduced, and point discharge caused under a high voltage condition can be effectively prevented with the stepwise voltage drop.

In a specific implementation, the touch method of at least one embodiment of the present disclosure may further include: in the $a^{th}$ touch time period and the $a^{th}$ background data detection time period, providing a ground voltage to touch driving electrodes included in the touch panel, except for the $a^{th}$ touch driving electrode and the N touch driving electrodes, so as to discharge static charges and shield remote signal interference.

In actual operation, a waveform of a voltage signal provided to each touch driving electrode can be controlled through a field programmable gate array (FPGA), the scheme design can be defined as an algorithm-oriented optimization, and a processing method of a touch sensing signal is a key factor of a touch structure, the problem of eliminating interference such as water stains can be solved, a waveform of an output voltage can be adjusted, and signal processing and noise reduction are realized.

In at least one embodiment of the present disclosure, the touch accompanying signal and the touch driving signal are of the same type.

Optionally, the touch accompanying signal and the touch driving signal are both square wave signals, or the touch accompanying signal and the touch driving signal are both sine wave signals.

In a specific implementation, to further reduce electro-magnetic interference (EMI) and the like, the touch driving signal and the touch accompanying signal may be sine wave signals, but the present disclosure is not limited thereto.

Optionally, a cycle of the touch accompanying signal is equal to a cycle of the touch driving signal; in a case that the touch accompanying signal and the touch driving signal are both square wave signals, a pulse width of the touch accompanying signal is equal to a pulse width of the touch driving signal.

Optionally, a ratio between the amplitude of the touch accompanying signal and the amplitude of the touch driving signal is larger than or equal to 0.05 and less than or equal to 0.3, so that a difference between the $a^{th}$ touch sensing signal and the $a^{th}$ background data voltage signal is enough to guarantee the touch detection precision while the noise is effectively reduced.

Preferably, the ratio may be greater than or equal to 0.1 and less than or equal to 0.2, but the present disclosure is not limited thereto.

In a specific implementations, N may be less than or equal to 10, but the present disclosure is not limited thereto.

In at least one embodiment of the present disclosure, the amplitude of the touch accompanying signal may be determined according to an environment temperature, and specifically, the amplitude can be determined by a voltage follower and a sensing unit such as a temperature sensitive resistor.

In an actual operation, the $a^{th}$ touch driving electrode is a first touch driving electrode included in the touch panel, and the N touch driving electrodes include a second touch driving electrode included in the touch panel to an $(N+1)^{th}$ touch driving electrode included in the touch panel; or, the $a^{th}$ touch driving electrode is a last touch driving electrode included in the touch panel, and the N touch driving electrodes include a second-to-last touch driving electrode included in the touch panel to an $(N+1)^{th}$-to-last touch driving electrode included in the touch panel; or, the $a^{th}$ touch driving electrode is a touch driving electrode included in the touch panel that is different from the first touch driving electrode and the last touch driving electrode, a part of the N touch driving electrodes are arranged before the $a^{th}$ touch driving electrode, and other part of the N touch driving electrodes are arranged after the $a^{th}$ touch driving electrode.

In an actual operation, in a case that the $a^{th}$ touch driving electrode is neither the first touch driving electrode included in the touch panel nor the last touch driving electrode included in the touch panel, a part of the N touch driving electrodes are arranged before the $a^{th}$ touch driving electrode, and other part of the N touch driving electrodes are arranged after the $a^{th}$ touch driving electrode.

In at least one embodiment of the present disclosure, for example, two lines of touch driving electrodes adjacent to and before the $a^{th}$ touch driving electrode and two lines of touch driving electrodes adjacent to and after the $a^{th}$ touch driving electrode may be selected as the adjacent touch driving electrodes.

Preferably, when the $a^{th}$ touch driving electrode is a touch driving electrode included in the touch panel that is different from the first touch driving electrode and the last touch driving electrode, N is an even number, N/2 touch driving electrodes are arranged before the $a^{th}$ touch driving electrode, and N/2 touch driving electrodes are arranged after the $a^{th}$ touch driving electrode.

In a specific implementation, when the $a^{th}$ touch driving electrode is a touch driving electrode included in the touch panel that is different from the first touch driving electrode and the last touch driving electrode, N/2 touch driving electrodes adjacent to and before the $a^{th}$ touch driving electrode and N/2 touch driving electrodes adjacent to and after the $a^{th}$ touch driving electrode are selected to be provided with the touch accompanying signal, so that the touch control precision can be improved.

Figure 2:
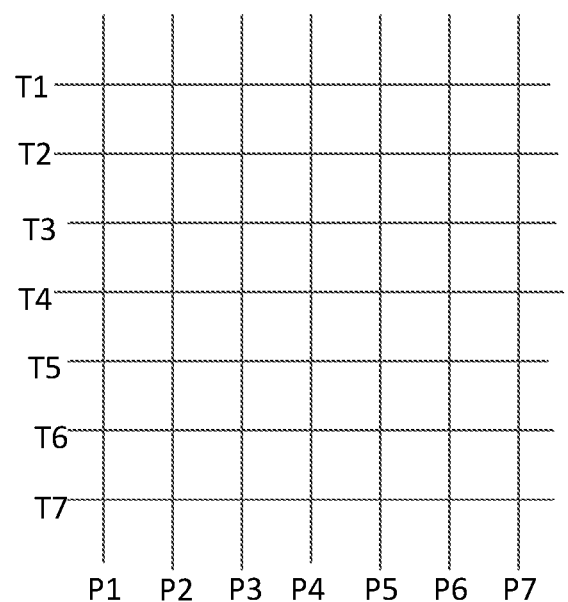
FIG. 2 is a schematic structural diagram of touch driving electrodes and touch sensing electrodes in a touch panel to which the touch method according to at least one embodiment of the present disclosure is applied.

As shown in FIG. 2, T1 denotes a first touch driving electrode included in the touch panel, T2 denotes a second touch driving electrode included in the touch panel, T3 denotes a third touch driving electrode included in the touch panel, T4 denotes a fourth touch driving electrode included in the touch panel, T5 denotes a fifth touch driving electrode included in the touch panel, T6 denotes a sixth touch driving electrode included in the touch panel, and T7 denotes a seventh touch driving electrode included in the touch panel.

Among the touch driving electrodes included in the touch panel as shown in FIG. 2, in a fourth touch time period, T4 is the $a^{th}$ touch driving electrode, T2 and T3 are two touch driving electrodes adjacent to and before T4, T5 and T6 are two touch driving electrodes adjacent to and after T4, and T1 and T7 are remote touch driving electrodes.

In FIG. 2, P1, P2, P3, P4, P5, P6 and P7 denote a first touch sensing electrode, a second touch sensing electrode, a third touch sensing electrode, a fourth touch sensing electrode, a fifth touch sensing electrode, a sixth touch sensing electrode and a seventh touch sensing electrode, respectively; in an actual operation, the touch driving electrodes and the touch sensing electrodes may be arranged in different layers.

Figure 3:
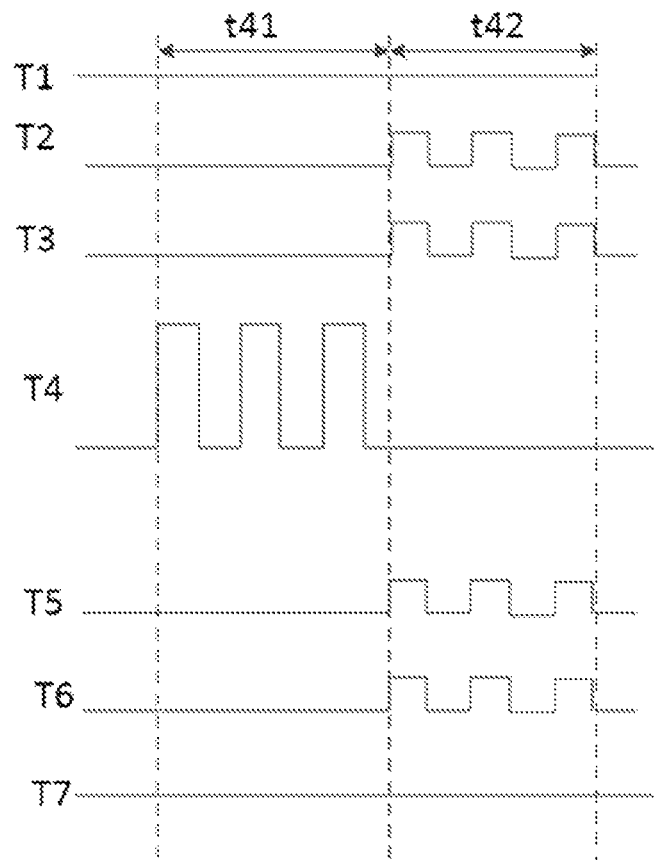
FIG. 3 is a waveform diagram of signals provided to various touch driving electrodes.

As shown in FIG. 3, in a fourth touch time period t41, a touch driving signal is provided to T4; in a fourth background data detection time period t42, a touch accompanying signal is provided to T2, T3, T5 and T6; in t41 and t42, a ground voltage is provided to T1 and T7.

As can be seen from FIG. 3, the touch driving signal provided to T4 and the touch accompanying signal provided to T2, T3, T5 and T6 are all square wave signals, and the amplitude of the touch driving signal is greater than the amplitude of the touch accompanying signal; the pulse width t1 of the touch driving signal is equal to the pulse width t2 of the touch accompanying signal; and the cycle T11 of the touch driving signal is equal to the cycle T12 of the touch accompanying signal.

Optionally, the performing the touch detection according to an $a^{th}$ touch sensing signal on the touch sensing electrodes in the $a^{th}$ touch time period and an $a^{th}$ background data voltage signal on the touch sensing electrodes in the $a^{th}$ background data detection time period may include:

comparing the $a^{th}$ touch sensing signal with the $a^{th}$ background data voltage signal to obtain an $a^{th}$ touch difference signal between the $a^{th}$ touch sensing signal and the $a^{th}$ background data voltage signal;

amplifying the $a^{th}$ touch difference signal to obtain an amplified $a^{th}$ touch difference signal; and performing the touch detection according to the amplified $a^{th}$ touch difference signal.

In a specific implementation, first, the $a^{th}$ touch sensing signal may be compared with the $a^{th}$ background data voltage signal to obtain the $a^{th}$ touch difference signal between the $a^{th}$ touch sensing signal and the $a^{th}$ background data voltage signal, and then the $a^{th}$ touch difference signal is amplified to obtain the amplified $a^{th}$ touch difference signal; the touch detection is performed according to the amplified $a^{th}$ touch difference signal. Errors caused by non-touch factors can be distinguished by processing the signal.

In at least one embodiment of the present disclosure, a touch blank time period is provided between two adjacent touch cycles, and the touch method further includes:

detecting an initial touch state of the touch panel in the touch blank time period, and performing the touch detection according to the initial touch state of the touch panel.

In an actual operation, the initial touch state of the touch panel may be detected in the touch blank time period. Since the changes in capacitance value generated by the suspended water drop (or the dirt) and generated by touching the touch panel with the actual human body or active stylus are different, the initial touch state can indicate the status of the touch panel resulting from touching the touch panel with an object other than a finger or active stylus, so that in the touch cycle, a touch detection error generated by touching the touch panel with an object other than the finger or the active stylus can be avoided according to the initial touch state.

In a specific implementation, the detecting the initial touch state of the touch panel in the touch blank time period may include:

in the touch blank time period, providing a touch driving signal to the touch driving electrode and receiving a touch sensing signal fed back by the touch driving electrode so as to determine the initial touch state of the touch panel; or, in the touch blank time period, providing a touch driving signal to the touch sensing electrodes and receiving a touch sensing signal fed back by the touch sensing electrodes so as to determine the initial touch state of the touch panel.

In an actual operation, the touch blank time period may be a non-conventional driving scanning time, and in the touch blank time period, a working mode of self-capacitance scanning is performed on the touch driving electrodes or the touch sensing electrodes to perform self-charging and discharging processes of channels, so that on one hand, electrostatic charges remained on the touch panel can be removed, and on the other hand, the water stain and dirt detection can be realized by using the self-capacitance touch control principle, and interference caused by the water stains, dirt and the like can be eliminated.

Figure 4:
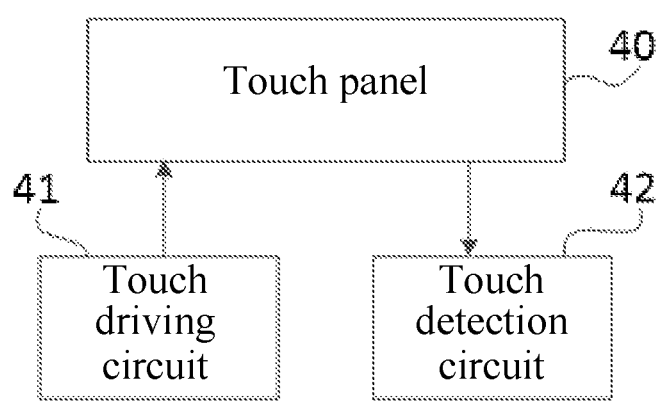
FIG. 4 is a structural block diagram of a touch circuit according to at least one embodiment of the present disclosure.

A touch circuit according to at least one embodiment of the present disclosure is applied to a touch panel, wherein the touch panel includes A touch driving electrodes and A touch sensing electrodes which are arranged on a substrate, and A is a positive integer; a touch cycle includes a plurality of touch time periods and a plurality of background data detection time periods; an $a^{th}$ background data detection time period is provided after an $a^{th}$ touch time period and before an $(a+1)^{th}$ touch time period; as shown in FIG. 4, the touch circuit includes:

a touch driving circuit 41, which is electrically connected to the touch driving electrodes (not shown in FIG. 4) included in the touch panel 40, is configured to provide a touch driving signal to an $a^{th}$ touch driving electrode in the $a^{th}$ touch time period, and is configured to provide a touch accompanying signal to N touch driving electrodes adjacent to the $a^{th}$ touch driving electrode in the $a^{th}$ background data detection time period; and, a touch detection circuit 42, which is electrically connected to the touch sensing electrodes (not shown in FIG. 4) included in the touch panel 40, and is configured to perform touch detection according to an $a^{th}$ touch sensing signal on the touch sensing electrodes in the $a^{th}$ touch time period and an $a^{th}$ background data voltage signal on the touch sensing electrodes in the $a^{th}$ background data detection time period;

wherein, a is a positive integer, and a is less than or equal to A; N is a positive integer; and an amplitude of the touch accompanying signal is less than an amplitude of the touch driving signal.

In at least one embodiment of the present disclosure, the touch driving signal and the touch accompanying signal should be substantially alike except for amplitude; for example, a cycle of the touch driving signal should be approximately the same as a cycle of the touch accompanying signal; in a case that the touch driving signal and the touch accompanying signal are both square wave signals, a pulse width of the touch driving signal may be approximately the same as a pulse width of the touch accompanying signal.

When the touch circuit of at least one embodiment of the present disclosure is in operation, in the $a^{th}$ background data detection time period, the touch driving circuit 41 provides a touch accompanying signal to the N touch driving electrodes adjacent to the $a^{th}$ touch driving electrode, the touch detection circuit 42 selects the $a^{th}$ background data voltage signal on the touch sensing electrodes in the $a^{th}$ background data detection time period as a background data signal. Due to the fact that the a touch accompanying signal is loaded on the N touch driving electrodes, and the amplitude of the touch accompanying signal is less than the amplitude of the touch driving signal, the stability of the $a^{th}$ background data voltage signal provided by the touch accompanying signal is greater than the stability of the background data signal provided in the related art. The $a^{th}$ background data voltage signal is selected as the background data signal, so that a threshold value can be increased appropriately, noise points generated by tiny signals can be effectively shielded, effective signals are more obvious, and a signal-to-noise ratio is improved.

In a specific implementation, the touch driving circuit is further configured to provide a ground voltage to touch driving electrodes included in the touch panel, except for the $a^{th}$ touch driving electrode and the N touch driving electrodes, in the $a^{th}$ touch time period and the $a^{th}$ background data detection time period, so as to discharge static charges and shield remote signal interference.

Optionally, the touch accompanying signal and the touch driving signal are of the same type; the touch accompanying signal and the touch driving signal are both square wave signals, or the touch accompanying signal and the touch driving signal are both sine wave signals.

In a specific implementation, a cycle of the touch accompanying signal may be equal to a cycle of the touch driving signal;

in a case that the touch accompanying signal and the touch driving signal are both square wave signals, a pulse width of the touch accompanying signal may be equal to a pulse width of the touch driving signal.

Optionally, a ratio between the amplitude of the touch accompanying signal and the amplitude of the touch driving signal is greater than or equal to 0.05, and less than or equal to 0.3, so that a difference between the $a^{th}$ touch sensing signal and the $a^{th}$ background data voltage signal can be enough to guarantee the touch detection precision while the noise is effectively reduced.

In at least one embodiment of the present disclosure, the $a^{th}$ touch driving electrode is a first touch driving electrode included in the touch panel, and the N touch driving electrodes include a second touch driving electrode included in the touch panel to an $(N+1)^{th}$ touch driving electrode included in the touch panel; or, the $a^{th}$ touch driving electrode is a last touch driving electrode included in the touch panel, and the N touch driving electrodes include a second-to-last touch driving electrode included in the touch panel to an $(N+1)^{th}$-to-last touch driving electrode included in the touch panel; or, the $a^{th}$ touch driving electrode is a touch driving electrode included in the touch panel that is different from the first touch driving electrode and the last touch driving electrode, a part of the N touch driving electrodes are arranged before the $a^{th}$ touch driving electrode, and other part of the N touch driving electrodes are arranged after the $a^{th}$ touch driving electrode.

In an actual operation, in a case that the $a^{th}$ touch driving electrode is neither the first touch driving electrode included in the touch panel nor the last touch driving electrode included in the touch panel, a part of the N touch driving electrodes are arranged before the $a^{th}$ touch driving electrode, and other part of the N touch driving electrodes are arranged after the $a^{th}$ touch driving electrode.

Figure 5:
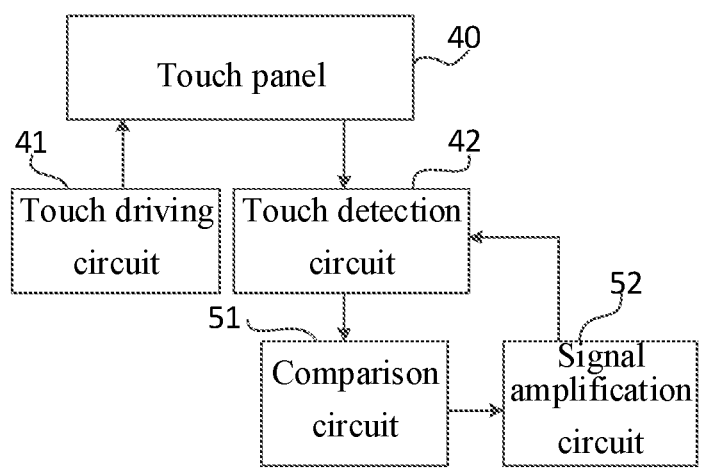
FIG. 5 is a structural block diagram of a touch circuit according to at least one embodiment of the present disclosure.

In a specific implementation, as shown in FIG. 5, on the basis of at least one embodiment of the touch circuit shown in FIG. 4, the touch circuit of at least one embodiment of the present disclosure may further include a comparison circuit 51 and a signal amplification circuit 52;

the comparison circuit 51 is electrically connected to the touch detection circuit 42 and is configured to compare the $a^{th}$ touch sensing signal with the $a^{th}$ background data voltage signal, to obtain an $a^{th}$ touch difference signal between the $a^{th}$ touch sensing signal and the $a^{th}$ background data voltage signal;

the signal amplification circuit 52 is electrically connected to the comparison circuit 51 and the touch detection circuit 42 respectively, and is configured to amplify the $a^{th}$ touch difference signal to obtain an amplified $a^{th}$ touch difference signal; and the touch detection circuit 42 is specifically configured to perform the touch detection according to the amplified $a^{th}$ touch difference signal.

In a specific implementation, firstly, the $a^{th}$ touch sensing signal may be compared with the $a^{th}$ background data voltage signal by using the comparison circuit 51 to obtain the $a^{th}$ touch control difference signal between the $a^{th}$ touch sensing signal and the $a^{th}$ background data voltage signal, and then the $a^{th}$ touch difference signal is amplified by using the signal amplification circuit 52 to obtain the amplified $a^{th}$ touch difference signal. The touch detection circuit 42 performs the touch detection according to the amplified $a^{th}$ touch difference signal, so that errors caused by non-touch factors can be distinguished by processing the signal.

Optionally, the touch detection circuit is further configured to detect an initial touch state of the touch panel in a touch blank time period and perform the touch detection according to the initial touch state of the touch panel; the touch blank time period is provided between two adjacent touch cycles.

In an actual operation, the touch detection circuit can detect the initial touch state of the touch panel in the touch blank time period. Since the changes in capacitance value generated by the suspended water drop (or the dirt) and generated by touching the touch panel with the actual human body or active stylus are different, the initial touch state can indicate the status of the touch panel resulting from touching the touch panel with an object other than a finger or active stylus, so that in the touch cycle, a touch detection error generated by touching the touch panel with an object other than the finger or the active stylus can be avoided according to the initial touch state.

In a specific implementation, the touch driving circuit is configured to provide a touch driving signal to the touch driving electrodes or the touch sensing electrodes in the touch blank time period;

the touch detection circuit is specifically configured to receive a touch sensing signal fed back by the touch driving electrodes or the touch sensing electrodes in the touch blank time period so as to determine the initial touch state of the touch panel.

The touch blank time period may be a non-conventional driving scanning time, in the touch blank time period, a working mode of self-capacitance scanning is performed on the touch driving electrodes or the touch sensing electrodes to perform self-charging and discharging processes of channels, so that, on one hand, electrostatic charges remained on the touch panel can be removed, on the other hand, the water stain and dirt detection can be realized according to a self-capacitance touch control principle, and interference caused by the water stains, the dirt and the like can be eliminated.

In an actual operation, a suspended water drop and a touch by an actual human body or active stylus would give rise to different change direction (positive/negative) of the capacitance value. Part of electric field lines may be absorbed when the human body touches, thus the electric field lines between the touch driving electrode and the touch sensing electrodes are reduced. The water drop is usually in a suspended state and may act as a medium layer for electric field transmission between the touch driving electrode and the touch sensing electrodes, and a dielectric constant of the water drop is greater than that of air, so that the electric field strength between the touch driving electrode and the touch sensing electrodes is increased. The change in capacitance value generated by touching the touch panel with an object other than the human body and active stylus, such as water stains and dirt, is different from the change in capacitance value generated by the human body or the active stylus, so that by adopting the working mode of self-capacitance scanning for the touch driving electrodes or the touch sensing electrodes in the touch blank time period, the detection of water stain, dirt and the like is realized by adopting the self-capacitance touch control principle, and the interference caused by the water stains, the dirt and the like can be eliminated.

A touch device according to at least one embodiment of the present disclosure includes the above-mentioned touch circuit.

The display device provided by at least one embodiment of the present disclosure may be any product or component with a display function, such as a mobile phone, a tablet computer, a television, a display, a notebook computer, a digital photo frame, a navigator.

While the foregoing is directed to optional embodiments of the present disclosure, it will be understood by those skilled in the art that various improvements and modifications may be made without departing from the principle of the present disclosure, and these improvements and modifications shall be deemed as falling within the scope of the present disclosure.

The invention claimed is:

1. A touch method, applied to a touch panel, wherein the touch panel comprises A touch driving electrodes and a plurality of touch sensing electrodes arranged on a substrate, and A is a positive integer; a touch cycle comprises a plurality of touch time periods and a plurality of background data detection time periods; an $a^{th}$ background data detection time period is provided after $a^{th}$ touch time period and before an $(a+1)^{th}$ touch time period; and the touch method comprises:
  in the $a^{th}$ touch time period, providing a touch driving signal to $a^{th}$ touch driving electrode; wherein a is a positive integer, and a is less than or equal to A;
  in the $a^{th}$ background data detection time period, providing a touch accompanying signal to N touch driving electrodes adjacent to the $a^{th}$ touch driving electrode; wherein N is a positive integer;
  performing touch detection according to $a^{th}$ touch sensing signal on the touch sensing electrodes in the $a^{th}$ touch time period and $a^{th}$ background data voltage signal on the touch sensing electrodes in the $a^{th}$ background data detection time period;
  wherein an amplitude of the touch accompanying signal is less than an amplitude of the touch driving signal;
  wherein the $a^{th}$ touch driving electrode is a touch driving electrode comprised in the touch panel that is different from a first touch driving electrode and a last touch driving electrode, N is an even number, and N/2 touch driving electrodes are arranged before the $a^{th}$ touch driving electrode, and N/2 touch driving electrodes are arranged after the $a^{th}$ touch driving electrode.

2. The touch method according to claim 1, further comprising: in the $a^{th}$ touch time period and the $a^{th}$ background data detection time period, providing a ground voltage to touch driving electrodes of the touch panel, except for the $a^{th}$ touch driving electrode and the N touch driving electrodes.

3. The touch method according to claim 1, wherein the touch accompanying signal and the touch driving signal are of the same type.

4. The touch method according to claim 3, wherein the touch accompanying signal and the touch driving signal are both square wave signals, or
  the touch accompanying signal and the touch driving signal are both sine wave signals.

5. The touch method according to claim 4, wherein a cycle of the touch accompanying signal is equal to a cycle of the touch driving signal;
  in a case that the touch accompanying signal and the touch driving signal are both square wave signals, a pulse width of the touch accompanying signal is equal to a pulse width of the touch driving signal.

6. The touch method according to claim 1, wherein a ratio between the amplitude of the touch accompanying signal and the amplitude of the touch driving signal is greater than or equal to 0.05, and less than or equal to 0.3.

7. The touch method according to claim 1, wherein N is less than or equal to 10.

8. The touch method according to claim 1, wherein the performing the touch detection according to the $a^{th}$ touch sensing signal on the touch sensing electrodes in the $a^{th}$ touch time period and the $a^{th}$ background data voltage signal on the touch sensing electrodes in the $a^{th}$ background data detection time period comprises:
  comparing the $a^{th}$ touch sensing signal with the $a^{th}$ background data voltage signal to obtain $a^{th}$ touch difference signal between the $a^{th}$ touch sensing signal and the $a^{th}$ background data voltage signal;
  amplifying the $a^{th}$ touch difference signal to obtain an amplified $a^{th}$ touch difference signal;
  performing the touch detection according to the amplified $a^{th}$ touch difference signal.

9. The touch method according to claim 1, wherein a touch blank time period is provided between two adjacent touch cycles, and the touch method further comprises:
  detecting an initial touch state of the touch panel in the touch blank time period, and performing the touch detection according to the initial touch state of the touch panel.

10. The touch method according to claim 9, wherein the detecting the initial touch state of the touch panel in the touch blank time period comprises:
  in the touch blank time period, providing a touch driving signal to the touch driving electrodes and receiving a touch sensing signal fed back by the touch driving electrodes so as to determine the initial touch state of the touch panel; or,
  in the touch blank time period, providing a touch driving signal to the touch sensing electrodes and receiving a touch sensing signal fed back by the touch sensing electrodes so as to determine the initial touch state of the touch panel.

11. A touch circuit, applied to a touch panel, wherein the touch panel comprises A touch driving electrodes and A touch sensing electrodes arranged on a substrate, and A is a positive integer; a touch cycle comprises a plurality of touch time periods and a plurality of background data detection time periods; $a^{th}$ background data detection time period is provided after $a^{th}$ touch time period and before an $(a+1)^{th}$ touch time period; and the touch circuit comprises:
  a touch driving circuit, configured to provide a touch driving signal to $a^{th}$ touch driving electrode in the $a^{th}$ touch time period, and provide a touch accompanying signal to N touch driving electrodes adjacent to the $a^{th}$ touch driving electrode in the $a^{th}$ background data detection time period; and,
  a touch detection circuit, configured to perform touch detection according to an $a^{th}$ touch sensing signal on the touch sensing electrodes in the $a^{th}$ touch time period and an $a^{th}$ background data voltage signal on the touch sensing electrodes in the $a^{th}$ background data detection time period;
  wherein a is a positive integer, and a is less than or equal to A; N is a positive integer; and an amplitude of the touch accompanying signal is less than an amplitude of the touch driving signal;
  wherein the $a^{th}$ touch driving electrode is a touch driving electrode comprised in the touch panel that is different from a first touch driving electrode and a last touch driving electrode, N is an even number, and N/2 touch driving electrodes are arranged before the $a^{th}$ touch driving electrode, and N/2 touch driving electrodes are arranged after the $a^{th}$ touch driving electrode.

12. The touch circuit according to claim 11, wherein the touch driving circuit is further configured to provide a ground voltage to touch driving electrodes of the touch panel, except for the $a^{th}$ touch driving electrode and the N touch driving electrodes, in the $a^{th}$ touch time period and the $a^{th}$ background data detection time period.

13. The touch circuit according to claim 11, wherein the touch accompanying signal and the touch driving signal are of the same type;
  the touch accompanying signal and the touch driving signal are both square wave signals, or the touch accompanying signal and the touch driving signal are both sine wave signals;
  a ratio between the amplitude of the touch accompanying signal and the amplitude of the touch driving signal is greater than or equal to 0.05 and less than or equal to 0.3.

14. The touch circuit according to claim 11, further comprising a comparison circuit and a signal amplification circuit, wherein,
  the comparison circuit is configured to compare the $a^{th}$ touch sensing signal with the $a^{th}$ background data voltage signal to obtain $a^{th}$ touch difference signal between the $a^{th}$ touch sensing signal and the $a^{th}$ background data voltage signal;
  the signal amplification circuit is configured to amplify the $a^{th}$ touch difference signal to obtain an amplified $a^{th}$ touch difference signal;
  the touch detection circuit is specifically configured to perform the touch detection according to the amplified $a^{th}$ touch difference signal.

15. The touch circuit according to claim 11, wherein,
  the touch detection circuit is further configured to detect an initial touch state of the touch panel in a touch blank time period, and perform the touch detection according to the initial touch state of the touch panel;
  the touch blank time period is provided between two adjacent touch cycles.

16. The touch circuit according to claim 15, wherein the touch driving circuit is configured to provide a touch driving signal to the touch driving electrodes or the touch sensing electrodes in the touch blank time period;
  the touch detection circuit is specifically configured to receive a touch sensing signal fed back by the touch driving electrodes or the touch sensing electrodes in the touch blank time period so as to detect the initial touch state of the touch panel.

17. A touch device, comprising a touch circuit, wherein the touch circuit is applied to a touch panel, the touch panel comprises A touch driving electrodes and A touch sensing electrodes arranged on a substrate, and A is a positive integer; a touch cycle comprises a plurality of touch time periods and a plurality of background data detection time periods; $a^{th}$ background data detection time period is provided after $a^{th}$ touch time period and before an $(a+1)^{th}$ touch time period; and the touch circuit comprises:
  a touch driving circuit, configured to provide a touch driving signal to $a^{th}$ touch driving electrode in the $a^{th}$ touch time period, and provide a touch accompanying signal to N touch driving electrodes adjacent to the $a^{th}$ touch driving electrode in the $a^{th}$ background data detection time period; and,
  a touch detection circuit, configured to perform touch detection according to an $a^{th}$ touch sensing signal on the touch sensing electrodes in the $a^{th}$ touch time period and an $a^{th}$ background data voltage signal on the touch sensing electrodes in the $a^{th}$ background data detection time period;
  wherein a is a positive integer, and a is less than or equal to A; N is a positive integer; and an amplitude of the touch accompanying signal is less than an amplitude of the touch driving signal;
  wherein the $a^{th}$ touch driving electrode is a touch driving electrode comprised in the touch panel that is different from a first touch driving electrode and a last touch driving electrode, N is an even number, and N/2 touch driving electrodes are arranged before the $a^{th}$ touch driving electrode, and N/2 touch driving electrodes are arranged after the $a^{th}$ touch driving electrode.

* * * * *